United States Patent [19]

Schehr et al.

[11] Patent Number: 4,950,149
[45] Date of Patent: Aug. 21, 1990

[54] MOLDING APPARATUS FOR FIBER-FILLED RESIN

[75] Inventors: Douglas K. Schehr, Columbia, Md.; William J. Hampshire, Peninsula, Ohio; Marvin T. Conger, Liberty, Miss.

[73] Assignee: The Goodyear Tire & Rubber Company, Akron, Ohio

[21] Appl. No.: 166,947

[22] Filed: Mar. 11, 1988

[51] Int. Cl.$^5$ .................... B29B 11/12; B29C 43/08
[52] U.S. Cl. .................................. 425/345; 425/350; 425/351; 425/419; 425/422; 425/444
[58] Field of Search ............... 425/348 R, 348 S, 350, 425/347, 354, 353, 415, 345, 346, 349, 422, 444, 259, 419

[56] References Cited

U.S. PATENT DOCUMENTS

| | | | |
|---|---|---|---|
| 1,706,874 | 3/1929 | Journo | 425/259 |
| 2,214,191 | 9/1940 | Batchell et al. | 425/348 |
| 2,701,399 | 2/1955 | Underwood et al. | 425/353 |
| 2,806,438 | 6/1955 | Welch | 425/348 |
| 2,875,471 | 3/1959 | Crowther | 425/349 |
| 3,063,390 | 11/1962 | Frank | 425/345 |
| 3,337,915 | 8/1967 | Alexander, Jr. | 425/353 |
| 3,474,497 | 10/1969 | Watts, Jr. | 425/351 |
| 3,694,859 | 10/1972 | Glasman | 19/144 S |
| 3,706,517 | 12/1972 | Wheaton, III et al. | 425/324 B |
| 3,718,415 | 2/1973 | De Felice | 425/351 |
| 3,844,701 | 10/1974 | Rockwell | 425/348 |
| 4,439,123 | 3/1984 | Sano et al. | 425/112 |
| 4,653,997 | 3/1987 | Sheffield et al. | 425/556 |
| 4,778,439 | 10/1988 | Alexander | 425/351 |

FOREIGN PATENT DOCUMENTS

| | | | |
|---|---|---|---|
| 95245 | 1/1963 | Denmark | 425/348 |
| 553116 | 5/1977 | U.S.S.R. | 425/350 |
| 961960 | 9/1982 | U.S.S.R. | 425/347 |

Primary Examiner—Jay H. Woo
Assistant Examiner—Khanh P. Nguyen
Attorney, Agent, or Firm—Alvin T. Rockhill; J. D. Wolfe

[57] ABSTRACT

An apparatus for continuously or intermittently molding fiber-reinforced plastic structural components includes a continuous passage or pathway having a series of stations thereon for charging a multiple part mold with a charge of chopped fiber reinforced resin or plastic, closing the mold parts to effect compaction of the charge, curing said charge into a molded article, opening the mold, ejecting the molded article and return the open mold to charging point, movement of said mold parts from open to closed position being controlled by spacing between vertical spaced set of rails supporting male and female parts of the mold, said spacing being controlled to effect indexing of said male and said female part in the curing station in a closed portion and to effect unindexing of the male and female part to open the mold and a method of using said apparatus to yield said molded article.

6 Claims, 2 Drawing Sheets

MOLDING APPARATUS FOR FIBER-FILLED RESIN

TECHNICAL FIELD

This invention relates to a method and apparatus for molding a charge of chopped filament loaded resin or plastic in a mold composed of a male part and a female part as the parts move along two vertical spaced apart endless paths through a series of stations along tracks for each part to move the parts from a spaced apart open position to a registered closed position to thereby compress said charge into an integral molded article when cured.

PRIOR ART

Fiber reinforced composite leaf springs and related articles are made by the processes described in U.S. Pat. Nos. 4,445,953 and 4,505,460, but these methods have certain defects, for instance U.S. Pat. No. 4,505,460 uses essentially continuous fibers and yields essentially constant cross-sectioned parts.

SUMMARY OF THE INVENTION

This invention provides a method of charging a mold composed of a male part and a female part with a chopped filament loaded resin, preferably in a series of passes over the open mold of the deposit apparatus, moving said mold around two vertically spaced endless paths by means of tracks for each part to effect compression of said charge into the shape of the desired molded article by the time the article is cured and stripping said article from the open mold. The open mold parts then returning to load station. In another aspect of this invention an apparatus for practicing the method comprises an endless path having a series of stations positioned thereon including a loading station, a heating or curing station and an unloading station through which each mold composed of a male part and a female part may move to be charged with a load of preferably axially oriented chopped filament containing resin, using separate tracks for each molded part to achieve closing of the mold to compress the load or charge and opening the mold to permit unloading and loading the mold.

In one aspect the apparatus shows the general lay-out for the preform continuous cure process. For this purpose the preform is laid directly in the preferably preheated female mold half. The male half is inserted into the female half by the incline of the rails. The mold is also opened by the rails and the molded article is removed or stripped from the mold, preferably by ejection. The mold is then returned to the preform machine to be loaded.

FIG. 3 shows the preform being laid in the female mold half. The two halves are held open during this time by the two vertical sets of supporting rails.

DETAILED DESCRIPTION INCLUDING BEST MODE OF THE INVENTION

The invention will be better understood in view of the following description of the several figures.

Figure 1:
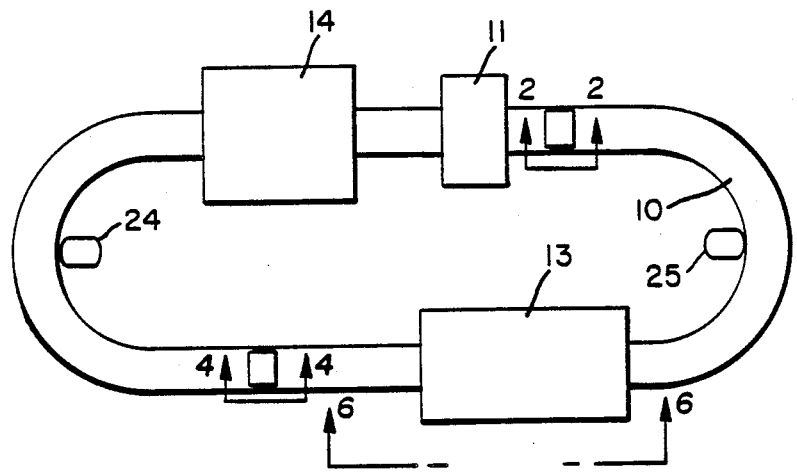
FIG. 1 is a schematic plan view of the molding apparatus.

FIG. 1 shows a preferred device for making chopped fiber reinforced resinous molded articles such as automotive leaf springs, grousers, grouser keepers, bows, skis and related products. The device comprises at least two pairs of spaced apart tracks, one above the other tracks for transporting the mold parts through the various stations thereon to permit the various operations to be performed during the molding and stripping operation. The mold parts, viz, the male parts 8 and the female parts 9 move successfully around the tracks, each track being an endless path 10 to permit the female part 9 to be charged with chopped filament loaded resin in the loading station 11, then be brought into register or index relation 12 to close the mold and exert sufficient pressure to compress the charge in the mold before being cured in the curing station 13, and then strip the molded article from the mold in the stripping or unloading station 14 before the mold returns to the load station. Usually the compression should be sufficient to give a bulk factor of 10 to 1 to 1 to 1 and preferably 4.5 to 5.5 to 1 to the cured article.

Figures 4, 5:
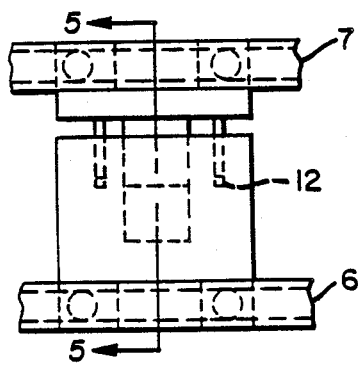
FIG. 4 is a vertical sectional view of the mold parts of FIG. 1 showing details of the wheels and the track relative to the indexing aspect of the apparatus in the cure station.
FIG. 5 is a cross-sectional view along lines 5,5 of FIG. 4 showing the indexing features in the closing position relative to the wheels and tracks.
Figure 6:
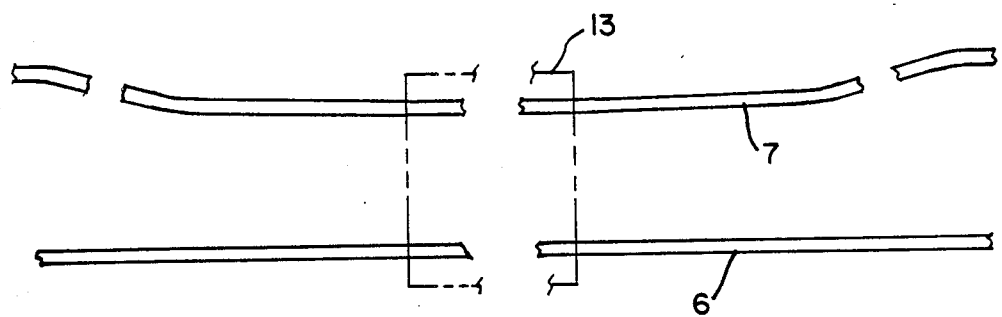
FIG. 6 shows a partial side elevation taken above lines 6,6 of FIG. 1.

After the preform is loaded, the two mold halves are moved toward the curing oven. As they are moved toward the oven 13, the rails supporting the male half of the mold are angled toward the rails supporting the female mold half. This angle can be large initially as the two halves are brought together by each vertical track angling together or only one angling toward the other. However, as the two mold halves begin to mesh, the angle will have to be small to prevent excessive tilting of the mold halves. If the final 9.6 cm of the mold closing is accomplished in 20 meters, the angle between the tracks would be only about 1 degree. FIGS. 4 and 5 show the final closing of the mold with the indexing pins resting well within the index wells and the preform 15 being compressed.

Figures 2, 3:
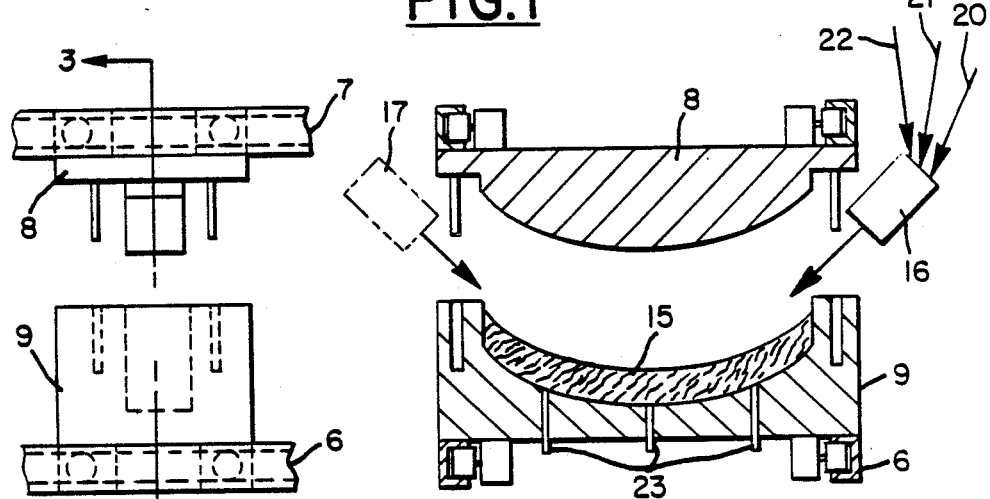
FIG. 2 is a vertical cross-sectional view through the loading station along lines 2,2.
FIG. 3 is a vertical sectional view through the apparatus of FIG. 2 to show the parts of the mold in relation to the vertical spaced sets of tracks in the wide open position.

Referring to FIGS. 2 and 3 the relation of the male half 8 above the female half 9 in the loading station 11 can be seen. The pair of rails, viz the overhead rails 7, holds the male half 8 above the female half 9 supported by the pair of rails, viz the lower rails 6. It should be appreciated that in the loading zone the distance between the mold halves must be sufficient to permit the preform machine 16 to move across the female half, in some cases to lay up the preform 15 in several passes either traversely or longitudinally as shown by the dotted outline of the preform machine 17 of FIG. 3. The mold can be mounted on the pairs of tracks either traversely or longitudinally. The traversely mounted molds in its long dimension permits easier indexing of the mold parts as the tilt is less steep.

For this process a commercial preform machine which is microprocessor controlled is preferred. It is desired in most cases, that 9.2 to 28.8 cm cut fibers be used and that the part will be laid in several passes in order to obtain as near as possible the effect of continuous fibers. If attempts are made to make the part in a single pass, the orientation of the fibers through the thickness will be at a slight angle rather than essentially longitudinal of the mold. There will be some degree of off-angle expected from this process. The maximum off-angle relative to the longitudinal direction can be calculated based on the fiber length and mold or spring width. For a 28.8 cm long fiber and 2.5 cm wide spring, it is preferred that the length be almost 28.8 cm and the maximum off-angle be no more than about 9.6° with in most cases there being no more than 5° in most desired cases and preferably 1 to 7°. However, most of the fiber would have an off-angle of less than the maximum. In a fatiguing situation, some off-angle might be desirable to give traverse reinforcement which is hard to obtain with the continuous fiber commercial pulforming process. Since the aspect ratio of a 28.8 cm long 675 yield glass fiber is far greater than the critical aspect ratio; these fibers should act as continuous fiber along the length of the molded part provided there is sufficient population of fibers and the cut ends are totally random along the length of the spring.

Since the maximum stress in bending is in the surface fibers and there will be no fibers outside the chopped ends, it might be necessary in some embodiments to lay one layer of continuous fibers into the mold at the beginning of the preform run and finish the preform with one layer of continuous fibers. This will eliminate exposed chopped fiber ends at the surface of the part where this is desired. Since it is preferred that the preform part be molded without the resin being B-staged, it is important that the compression mold be constructed with good shear edges. Preferably the preform part will be laid up directly in the preheated female mold half of the compression mold, usually about 90° C. to 185° C. This will require that preferably the telescoping depth of the mold be sufficient to handle the preform bulk factor usually about 5 to 1 but may be from 10 to 1 to 1 to 1. The mold should also be constructed with a minimum draft angle consistent with being able to remove the cured part. It will be desirable to have knock-out pins to force the cured part from the mold in the demolding station. Our experience with laying up preform in the mold with the present preform machine 16 shows, a preform of this type can be laid in as little as 1.5 minute cycles. A single preform line will produce 200,000 springs per year if the plant operates on a 24-hour day and 260 days/year. However, in order to lay the preform with the number of passes desired, the chopper will have to traverse the mold length at rates between 6 and 12 meters/minutes although other ratios may be desirable. This rate may be accomplished using a ball screw drive along a screw support. Pneumatic or hydraulic drives may also be used to move the preform machine from positions 18 to 17.

Referring again to FIG. 2, the preform machine is shown mounted above the female mold half 9 and below the male half 8. The drive operates a screw to move the filament chopping resin application machine back and forth across the open female mold half from position 17 to position 18 to deposit the chopped filament and resins on the surface of the female mold half in the manner done by the traditional hand lay up method. It is preferred that the preform be laid down in a series of passes over the mold until the desired fill of the female part is achieved to give a molded part of the required thickness. It should be appreciated that the filament chopping and resin system application machine is of the standard commercial type where the filaments such as glass rovings are fed from a roll or rolls (not shown but represented by arrows 20) of such filaments through chopper head or heads to be spray coated by spray heads of said machine with the curable resin. The resin is supplied to the spray head from the resin tank (not shown) by a flexible line 21 together with hardener by a flexible line 22, from hardener tank (not shown) to yield a curable resin. Preferably the resin and hardener are mixed inline, or in a continuous mixing head, just as it enters the spray head. Other well known mixing means may be used. Representative resin and hardener systems are listed below: epoxy resins and MDA, MPDA, DADS and other aromatic amines and hardeners, epoxy resins and NMA, HHPA, THPA and other anhydrides hardeners, unsaturated polyester-peroxides catalysts polyurethane-isocyanates plus polyurethane curatives, epoxy resins—tetra, tri and other aliphatic amines furan resins—acid catalysts, phenolic resins—amine curing agents, vinyl ester resins and peroxide catalysts.

Since there will be some variations in the amount of material in the mold, the rails cannot be rigidly fixed during the final closing and curing of the part. It is also desirable that some pressure be maintained on the part during curing. This variable spacing between the two sets of rails may be accomplished with spring or other suitable means such as a hydraulic ram.

Curing is accomplished in an oven. The length of the oven required will depend on the lay-up rate and the cure time required at the temperature attainable in the oven. Suitable cure temperatures are 100° C. to 200° C. but those of ordinary skill in the use of the resin hardener systems will readily know what variations may be used to aid in getting the desired cure time. In the case of the composite leaf spring, the molds could be aligned lengthwise parallel to the rails or traverse to the rails. To reduce the length of oven required and the tilting effect during the final closing of the mold, the traverse alignment would be more desirable.

With a lay-up rate of 1.5 minutes/part and a cure time of 9 minutes, the oven will have to be at least sufficiently long to hold 6 molds for continuous operation. If the molds are 28.8 cm wide, the oven will be approximately 12 meters long. Since in preferred operation no B-staging is required and the part is laid-up in a heated mold using a preheated resin mixture, usually less than 9 minutes will be sufficient in the oven with most curable systems. It is desirable that the mold be pushed through the oven by the incoming molds rather than by being driven through the oven. This will give the maximum oven time and will reduce the number of molds required.

After cure the mold opening is accomplished by the distance between the two sets of vertical spaced rails increasing due to the tilt of the rails. Usually about 1 degree tilt during first 20 meters and thereafter at a more rapid rate until the maximum distance is reached about time the mold part reaches the stripping station. At some point after the molds are apart, preferably in an ejection station 14, ejection pins 23 will be activated to eject the part from the mold. The activation may be by blows on the pin or by air pressure thereon. The empty mold is returned to the preform machine 16 in FIG. 3 in the open position to be loaded.

Ten molds should be sufficient for each preform line. This is based on having six molds in the curing oven at all times, one mold at the preform machine, one mold being prepared for the preform machine, one mold being closed, and one mold being opened. Two separate drives 24,25 will be required in the preferred embodiments, a conventional motor drive chain drive may be used. One drive would drive the mold from the preform machine and drive it through the closing station and into the oven. The second drive would engage the mold emerging from the curing oven due to another mold entering the curing oven, and drive it through the opening, the ejection of the part, and back to the preform machine to be loaded.

While certain representative embodiments and details have been shown for the purpose of illustrating the invention, it will be apparent to those skilled in this art that various changes and modifications may be made therein without departing from the scope of the invention.

What is claimed is:

1. An apparatus for molding a charge of oriented chopped filament loaded resin into a molded article comprising moving at least one mold composed of a male part and a female part each part moving on separate vertically separated tracks through an endless passage past a series of stations, including a loading station, having means to deposit an oriented charge of chopped filament loaded resin in said female part;

a mold closing station;

a curing station and an unloading station having means to eject the article from the female part, said parts moving at least in an indexed contact during passage through said cure station, but being moved to essentially a fully spaced apart relationship when the female part enters said unloading station until it leaves said loading station;

movement of said parts relative to each other being controlled by spacing and alignment between said tracks respectively for each part, said tracks being inclined at sufficient angle to bring said parts into index and under sufficient contact to exert enough pressure on a charge of chopped filament loaded resin between said parts to compress the charge into a unitary article at least by time said mold moves from the cure station and having a reverse angle of inclination from the cure station to move said parts to the fully spaced apart relationship by time the female part enters said unloading station and maintain said fully spaced apart relationship until the female part leaves the loading station.

2. The apparatus of claim 1 wherein the female mold part has sides forming a cavity that telescope inward from the top thereof toward the bottom thereof.

3. The apparatus of claim 1 wherein the mold parts are aligned transverse to the path of their movement.

4. The apparatus of claim 1 wherein the spaced apart vertical set of tracks angle downward for about 20 meters at about an angle of 1° to permit mold parts to index.

5. The apparatus of claim 1 wherein the male mold part is moved on a set of tracks vertically disposed above the set of tracks moving the female mold parts.

6. The apparatus of claim 1 wherein the tracks are two sets disposed vertically spaced one from the other with the angle of inclination from the loading station being sufficient to effect closing of the mold under sufficient pressure to mold the charge in the female part by the time the mold leaves the oven and the angle of inclination of tracks being reversed to open the mold by the time the stripping station is reached and maintains the mold open until the mold leaves the loading station.

* * * * *